(12) United States Patent
Leimbach et al.

(10) Patent No.: US 7,564,624 B2
(45) Date of Patent: Jul. 21, 2009

(54) MICROSCOPE

(75) Inventors: Volker Leimbach, Ludwigshafen (DE); Heinrich Ulrich, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 11/569,914

(22) PCT Filed: Jun. 22, 2005

(86) PCT No.: PCT/EP2005/052911

§ 371 (c)(1),
(2), (4) Date: Dec. 1, 2006

(87) PCT Pub. No.: WO2006/000563

PCT Pub. Date: Jan. 5, 2006

(65) Prior Publication Data

US 2007/0176085 A1   Aug. 2, 2007

(30) Foreign Application Priority Data

Jun. 24, 2004   (DE) ...................... 10 2004 030 669

(51) Int. Cl.
*G02B 21/06* (2006.01)
*G02B 21/00* (2006.01)

(52) U.S. Cl. .................. 359/388; 359/368; 359/385
(58) Field of Classification Search ......... 359/368–390; 385/31
See application file for complete search history.

(56) References Cited

U.S. PATENT DOCUMENTS

| | | | | |
|---|---|---|---|---|
| 4,969,702 A | * | 11/1990 | Anderson | .................. 385/33 |
| 6,389,198 B2 | * | 5/2002 | Kafka et al. | .................. 385/31 |
| 6,603,780 B2 | | 8/2003 | Miyai | .................. 322/23 |
| 6,717,723 B2 | * | 4/2004 | Arai | .................. 359/368 |
| 7,190,514 B2 | * | 3/2007 | Mikuriya et al. | .................. 359/385 |
| 2002/0085806 A1 | * | 7/2002 | Pezeshki et al. | .................. 385/31 |
| 2003/0007365 A1 | * | 1/2003 | Sander | .................. 362/554 |

FOREIGN PATENT DOCUMENTS

| | | |
|---|---|---|
| DE | 196 33 185 | 10/1997 |
| DE | 101 55 002 A1 | 5/2003 |
| DE | 103 11 286 A1 | 9/2003 |
| DE | 102 51 897 A1 | 5/2004 |
| EP | 0495930 B1 | 4/1999 |
| JP | 8-68942 * | 3/1996 .................. 359/385 |
| JP | 09 127424 A | 5/1997 |
| JP | 1 396 739 A | 3/2004 |

OTHER PUBLICATIONS

English translation of the Japanese reference No. 8-68942.*

* cited by examiner

*Primary Examiner*—Thong Nguyen
(74) *Attorney, Agent, or Firm*—Houston Eliseeva LLP

(57) ABSTRACT

The invention relates to a microscope comprising at least one first and second light sources, a first light-guiding fiber connected to the first light source and a second light-guiding fiber connected to the second light source, wherein the light emitted by corresponding light source is injectable into the connected light-guiding fiber. The inventive microscope also comprises an objective lens disposed in the illumination beam path and is characterized in that a fiber multiplexer connected to the first and second light-guiding fibers, receiving the light from the light source and selectively allowing the light from the first or second light source to pass is disposed in the illumination beam path.

4 Claims, 1 Drawing Sheet

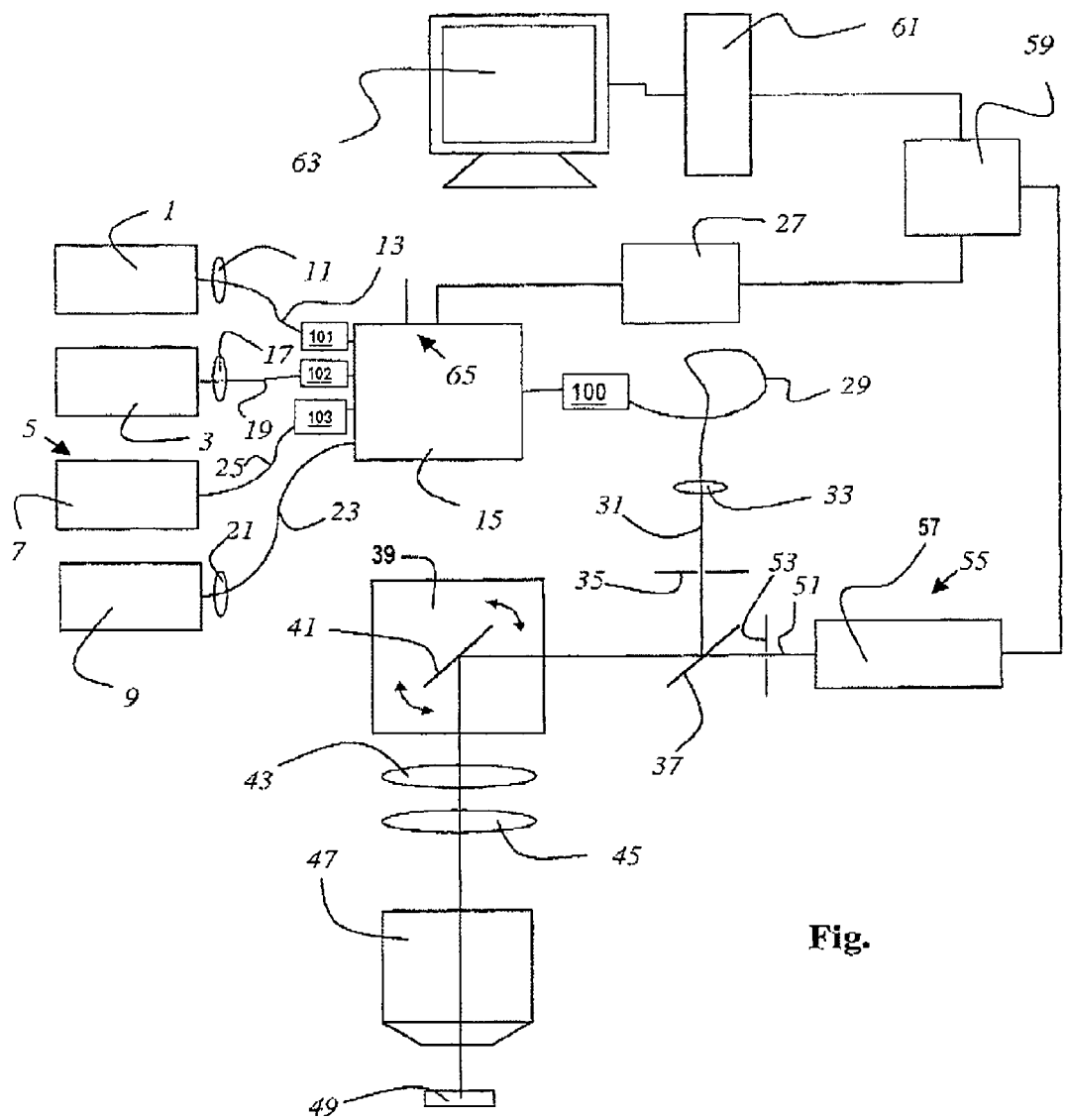
Fig.

MICROSCOPE

FIELD OF THE INVENTION

The invention relates to a microscope with at least a first light source and a second light source, whereby the first light source is coupled to a first light-guiding fiber and the second light source is coupled to a second light-guiding fiber, and whereby the light emitted by each light source is coupled to the connected light-guiding fiber and to an objective arranged in an illumination beam path.

BACKGROUND OF THE INVENTION

In scanning microscopy, a sample is scanned with a light beam in order to observe the reflection or fluorescent light emitted by the sample. Lasers are frequently used as the light source for this purpose. For example, an arrangement with a single laser that emits several laser lines is known from EP 0 495 930, "Confocal microscope system for multicolor fluorescence." Currently, mixed gas lasers, in particular ArKr lasers are usually used for the purpose. The focus of an illumination light beam is moved in an object plane with the help of a maneuverable beam deflector, generally by tipping two mirrors, whereby the axes of deflection are usually positioned perpendicular to each other, so that one mirror deflects in the x-direction and the other in the y-direction. The mirrors are tipped with the help, for example, of galvanometric positioners. The power of the light coming from the object is measured dependent on the position of the scanning beam. Generally, the positioners are provided with sensors to determine the actual position of the mirrors.

In confocal scanning microscopy in particular, an object is scanned in three dimensions with the focus of a light beam.

A confocal scanning microscope generally comprises a light source, a focusing optic with which the light from the source is focused on a pinhole aperture—the so-called excitation aperture—, a beam splitter, a beam deflector to control the beam, a microscope optic, a detection aperture, and detectors to detect the detection light or fluorescent light, as the case may be. The illumination light is coupled via the beam splitter. The fluorescent light or reflection light coming from the object returns to the beam splitter via the beam deflector, passes through it, and finally focuses on the detection aperture, behind which are the detectors. Detection light that does not originate directly from the focal region takes another light path and does not pass through the detection aperture, so that pixel information is obtained that leads to a three-dimensional image as a result of sequential scanning of the object. In most cases, a three-dimensional image is achieved by layered data imaging, whereby the path of the scanning light beam ideally describes a meander on or in the object. (Scanning a line in the x-direction at a constant y-position, then interrupting x-scanning and y-repositioning to the next line to be scanned, and then scanning this line at a constant y-position in negative x-direction, etc.). To enable layered data imaging, the sample table or the objective is repositioned after scanning a layer so that the next layer to be scanned is brought into the focal plane of the objective.

A multicolor spotlight source for a laser scanning microscope is known from DE 196 33 185. The multicolor spotlight source has at least two lasers of different wavelengths, which scan over the sample, that produce a multicolor spot on a sample to be tested, whereby a beam combiner is provided that is optically connected with the lasers, is located between the laser scanning microscope and the lasers, and coaxially combines the laser beams of the laser. A possible developmental variant provides that a laser is coupled directly and other lasers are coupled via light-guiding fibers in the beam combiner. The beam combiner is designed as a monolithic unit. A light guide, which transmits all of the coaxially combined beams from all lasers to the laser scanning microscope is provided between the beam combiner and the laser scanning microscope, whereby the laser beams are adjustable on this light guide.

An optical fiber switching device with a displaceable light-guiding fiber and a production method are known from DE 102 51 897 A1. The optical fiber switching device comprises at least one displaceable light-guiding fiber and at least one control electrode to produce an electrostatic field, which controls the spatial position of the displaceable light-guiding fiber to the optical coupling with at least one second light-guiding fiber. In order to disclose an improved optical fiber switching device, the switching device has an electrically isolating housing, the inner wall of which is partly formed by at least one control electrode.

Generally in microscopy, if a microscope is provided with several light sources, a dichroic or dichromatic beam splitter is used to combine the beam paths of the light sources. Additional components such as acousto-optical filters (AOTF), which are complicated to adjust, are necessary to control the light power of the individual lights emitted by the light sources. Combining beams with conventional optics is therefore both space consuming and very costly. Further disadvantages include the great complexity of adjustment and the susceptibility to interference.

SUMMARY OF THE INVENTION

It is therefore the object of the present invention to disclose a microscope the light source of which may be optically coupled to the illumination light beam in a simple manner that is compact and structurally reliable.

This object is solved by a microscope wherein a fiber multiplexer that is coupled to the first and to the second light-guiding fiber and receives the light from the light sources and selectively allows passage of the light from the first light source or the light from the second source, is provided in the illumination light beam.

The microscope according to the invention has the advantage that a sample can be illuminated simply with light sources having different light, depending on individual requirements. By the use of light-guiding fiber technology, the microscope according to the invention is extremely resistant to interference such as from vibration or contamination of optical components by dust.

Preferably, the fiber multiplexer (fiber-optic switching device) is permanently integrated in a housing and therefore robust in use. Preferably, an x-in-1 fiber multiplexer (e.g., 2-in-1, 3-in 1, 4-in-1, 5-in-1, etc.) is used, whereby they will play a subordinate role in most applications such that the light from only a single light source reaches this sample during the observation process.

In more complex fiber multiplexers, it may be provided that the light from several light sources is allowed to pass and is preferably coupled to an output fiber.

In a particularly preferred embodiment of the invention, an output fiber is provided that is coupled to the fiber multiplexer. The fiber coupler couples the light from one or several light sources in this output fiber. An outcoupling optic is preferably provided at the end of the output fiber, which collimates the light exiting the outcoupling fiber. Preferably, the first and/or the second light source comprises a laser. In a particularly preferred embodiment of the invention, this laser is implemented as a pigtail laser that is coupled directly to a light-guiding fiber.

To adjust or control the light power, in a variant of the microscope according to the invention fiber attenuators 101, 102, and 103 (see the Figure) are provided in the first light fiber and/or in the second light fiber.

In a further variant, an attenuator 100 (see the Figure), which may, for example, be implemented as a fiber attenuator, is subordinated to the fiber multiplexer.

In a very particularly preferred embodiment, the microscope is implemented as a scanning microscope, in particular as a confocal scanning microscope.

Preferably, the fiber multiplexer may be switched synchronously for pixel-by-pixel scanning of the scan field. This makes it possible for adjacent pixels to be exposed with wavelengths of differing light and/or light power.

In a further variant, it is provided that the fiber multiplexer may be switched synchronously for line-by-line scanning of a scan field. In this variant, it is, in particular, possible to expose one scan line after another with light of different wavelengths and/or light power. It is also possible to expose adjacent scan lines with illumination light of different wavelengths and/or light power In a further embodiment of the invention, it is provided that the fiber multiplexer may be switched synchronously for frame-by-frame scanning of a scan field. This variant makes it possible to scan a scan field sequentially several times under different illumination conditions with regard to wavelength and/or light power.

Advantageously, the fiber multiplexer arrangement of the microscope according to the invention replaces both complex beam combining as well as the generally provided shutter behind each light source to interrupt the illumination light beam.

In a particular variant, it is provided that a coupling port of the fiber multiplexer remain unused (that is, no light source coupled), and that to completely interrupt sample illumination, the fiber multiplexer switches to this "dummy port."

The object of the invention is schematically represented in the diagrams and is described based on the figures below, whereby components that have the same function are given the same reference numbers.

BRIEF DESCRIPTION OF THE DRAWINGS

FIG. 1 shows a microscope according to the invention.

DETAILED DESCRIPTION OF THE INVENTION

The figure shows a microscope according to the invention that is implemented as a confocal scanning microscope. The microscope exhibits a first light source 1 that is implemented as a laser light source, which emits light having a wavelength of 488 nm. Furthermore, the scanning microscope has a second light source 3 that is also implemented as a laser, and which emits light having a wavelength of 532 nm. The scanning microscope comprises a third light source 5 that is implemented as a pigtail laser 7, which emits light having a wavelength of 635 nm. Furthermore, the scanning microscope has a fourth light source 9 that is also implemented as a laser, and which emits a light source having a wavelength of 405 nm.

The light from the first light source 1 is coupled with a first coupling optic 11 to a first light-guiding fiber 13, which is coupled to a fiber multiplexer 15. The light from the second light source 3 is coupled with a second coupling optic 17 to a second light-guiding fiber 19, which is also coupled to the fiber multiplexer 15. Analogously, the light from the fourth light source 9 is coupled to a fourth light-guiding fiber 23 with the help of a third coupling optic 21. The fourth light-guiding fiber 23 is also connected optically to the fiber multiplexer 15. The pigtail laser 7 is coupled to a third light-guiding fiber 25 that transports the light of the pigtail laser 7 to the fiber multiplexer. The fiber multiplexer 15 is controlled via a control unit 27 according to user input or according to individual experimental specifications. The fiber multiplexer 15 allows light to pass depending on the control of the light from the first light source 1 or the light from the second light source 3 or the light from the third light source 5 or the light from the fourth light source 9 and couples it to an output fiber 29. The light that passes through the output fiber 29 is subsequently designated as an illumination light beam 31. The illumination light beam 31 is outcoupled with the outcoupling optic 33 and subsequently reaches the detection pinhole aperture 35, passes through it, and is then deflected by the subsequent main beam splitter 37 to the beam deflector 39, which comprises a cardanically suspended scanning mirror 41. The beam deflector 39 guides the illumination light beam 31 through the scanning optic 43, the tube optic 45, and through the microscope objective 47 over or through the sample 49. The detection light 51 emitted by the sample returns to the main beam splitter 37 via the same light path, namely via the microscope objective 47, the tube optic 45, and the scanning optic 43 as well as via the beam deflector 39, passes through it and the subsequent detection pinhole aperture 53, before finally reaching the detector 55, which is implemented as a photomultiplier 57. The detector 55 produces electrical signals that are proportional to the light power of the detection light 51, which are then transmitted to a processing unit 59. The electrical signals are then connected in the processing unit to each of the positional signals of the beam deflector 39 and image data are produced that are then transmitted to a PC 61 the monitor 63 of which displays an image of the sample. The processing unit 59 controls the control module 27 of the fiber multiplexer 15 according to the specifications of the experiment or according to user input. The fiber multiplexer 15 has a fifth input port which is, however, not coupled to a laser. To completely switch off sample illumination, the fiber multiplexer 15 is switched to this dummy port 65.

The invention is described in relation to a particular embodiment. It is obvious, however, that changes and modifications may be carried out with abandoning the scope of protection of the following claims.

The invention claimed is:

1. A microscope comprising:
   at least a first laser and a second laser, the first laser being coupled to a first light-guiding fiber and the second laser being coupled to a second light-guiding fiber;
   an output fiber disposed in an illumination beam path;
   an attenuator disposed on the output fiber;
   a microscope objective disposed in the illumination beam path; and
   a fiber multiplexer disposed in the illumination beam path and coupled to the output fiber, to the first light guiding fiber, and to the second light-guiding fiber, the fiber multiplexer receiving the light emitted by the first laser and coupled to the first light guiding fiber and the light emitted from the second laser and coupled to the second light guiding fiber, the fiber multiplexer selectively passing the light from the first laser or the light from the second laser onto the illumination beam path toward the microscope objective,
   wherein the microscope is a scanning microscope, wherein the selection by the fiber multiplexer is in response to positional signals from a scanning beam deflector, and wherein the fiber multiplexer can be switched synchronously for pixel-by-pixel scanning of a scan field.

2. A microscope comprising:

at least a first laser and a second laser, the first laser being coupled to a first light-guiding fiber and the second laser being coupled to a second light-guiding fiber;

an output fiber disposed in an illumination beam path;

an attenuator disposed on the output fiber;

a microscope objective disposed in the illumination beam path; and a fiber multiplexer disposed in the illumination beam path and coupled to the output fiber, to the first light guiding fiber, and to the second light-guiding fiber, the fiber multiplexer receiving the light emitted by the first laser and coupled to the first light guiding fiber and the light emitted from the second laser and coupled to the second light guiding fiber, the fiber multiplexer selectively passing the light from the first laser or the light from the second laser onto the illumination beam path toward the microscope objective, wherein the microscope is a scanning microscope, wherein the selection by the fiber multiplexer is in response to positional signals from a scanning beam deflector, and wherein the fiber multiplexer can be switched synchronously for line-by-line scanning of a scan field.

3. A microscope comprising:

at least a first laser and a second laser, the first laser being coupled to a first light-guiding fiber and the second laser being coupled to a second light-guiding fiber;

an output fiber disposed in an illumination beam path;

an attenuator disposed on the output fiber;

a microscope objective disposed in the illumination beam path; and a fiber multiplexer disposed in the illumination beam path and coupled to the output fiber, to the first light guiding fiber, and to the second light-guiding fiber, the fiber multiplexer receiving the light emitted by the first laser and coupled to the first light guiding fiber and the light emitted from the second laser and coupled to the second light guiding fiber, the fiber multiplexer selectively passing the light from the first laser or the light from the second laser onto the illumination beam path toward the microscope objective, wherein the microscope is a scanning microscope, wherein the selection by the fiber multiplexer is in response to positional signals from a scanning beam deflector, and wherein the fiber multiplexer can be switched synchronously for frame-by-frame scanning of a scan field.

4. The microscope according to claim 3, wherein the first laser is a pigtail laser.

* * * * *